(12) United States Patent
Feng et al.

(10) Patent No.: US 11,913,336 B2
(45) Date of Patent: Feb. 27, 2024

(54) LOW-POWER MICROWAVE CORING MACHINE SUITABLE FOR LUNAR ROCKS AND METHOD OF USING THE SAME

(71) Applicant: Northeastern University, Shenyang (CN)

(72) Inventors: Xiating Feng, Shenyang (CN); Feng Lin, Shenyang (CN); Chengxiang Yang, Shenyang (CN); Jun Tian, Shenyang (CN); Tianyang Tong, Shenyang (CN); Shiping Li, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 293 days.

(21) Appl. No.: 17/618,365

(22) PCT Filed: Apr. 1, 2021

(86) PCT No.: PCT/CN2021/084817
§ 371 (c)(1),
(2) Date: Dec. 10, 2021

(87) PCT Pub. No.: WO2022/205263
PCT Pub. Date: Oct. 6, 2022

(65) Prior Publication Data
US 2022/0364467 A1 Nov. 17, 2022

(30) Foreign Application Priority Data
Mar. 30, 2021 (CN) .......................... 202110338295.3

(51) Int. Cl.
*E21B 3/02* (2006.01)
*E21C 51/00* (2006.01)
(Continued)

(52) U.S. Cl.
CPC ................ *E21C 51/00* (2013.01); *E21B 3/02* (2013.01); *E21B 7/00* (2013.01); *E21B 15/003* (2013.01);
(Continued)

(58) Field of Classification Search
CPC ... E21C 51/00; E21B 3/02; E21B 7/00; E21B 7/15; E21B 15/003; E21B 25/00; E21B 17/0285; H01P 5/12; H02K 11/30
See application file for complete search history.

(56) References Cited

U.S. PATENT DOCUMENTS

| | | | | |
|---|---|---|---|---|
| 3,642,078 A | * | 2/1972 | Dornfeld | ................. E21B 7/201 173/160 |
| 4,190,116 A | * | 2/1980 | O'Neal | .................... E21B 21/16 173/198 |
| 2011/0056713 A1 | * | 3/2011 | Sherrit | ....................... E21B 1/02 173/2 |

FOREIGN PATENT DOCUMENTS

| | | |
|---|---|---|
| CN | 105510078 A | 4/2016 |
| CN | 106895991 A | 6/2017 |

(Continued)

*Primary Examiner* — Suman K Nath
(74) *Attorney, Agent, or Firm* — Muncy, Geissler, Olds & Lowe, P.C.

(57) ABSTRACT

The invention relates to a low-power microwave coring machine suitable for lunar rocks and a use method. The low-power microwave coring machine suitable for lunar rocks comprises an equipment platform, wherein the support framework front plate and the support framework rear plate are mounted on the equipment platform in a sliding manner, a rear end surface of the support framework rear plate is connected with a front end of the microwave generator mounted on the equipment platform, a rear end of the microwave generator is sequentially connected with the fixed waveguide, the rotary waveguide, the power divider and the drill drum, the high-precision slip ring structure is
(Continued)

mounted on the drill drum, the gear ferrules are arranged on an outer wall of the rotary waveguide and an outer wall of the drill drum.

6 Claims, 7 Drawing Sheets

(51) Int. Cl.
    *E21B 15/00*     (2006.01)
    *E21B 25/00*     (2006.01)
    *H02K 11/30*     (2016.01)
    *E21B 7/00*     (2006.01)
    *H01P 5/12*     (2006.01)

(52) U.S. Cl.
    CPC ................ *E21B 25/00* (2013.01); *H01P 5/12* (2013.01); *H02K 11/30* (2016.01)

(56) References Cited

FOREIGN PATENT DOCUMENTS

| | | |
|---|---|---|
| CN | 108463020 A | 8/2018 |
| CN | 111322025 A | 6/2020 |
| WO | WO-2011/031747 A2 | 3/2011 |

\* cited by examiner

LOW-POWER MICROWAVE CORING MACHINE SUITABLE FOR LUNAR ROCKS AND METHOD OF USING THE SAME

BACKGROUND OF THE INVENTION

1. Field of the Invention

The invention belongs to the technical field of rock drilling, and particularly relates to a low-power microwave coring machine suitable for lunar rocks and a use method.

2. The Prior Arts

For rotary drilling of hard rocks, a drill bit drills forward through torque and thrust applied to the drill bit by a drill rig. However, due to the hardness of the rocks, problems such as sticking of drill tools, unmoving of the drill tools and serious wear of the drill bit are often encountered, and especially the construction progress will be seriously affected during sticking of the drill tools.

The drilling of lunar rock materials has great significance on study of lunar occurrence resources. At present, lunar drilling work is mainly used for lunar soil which is loose overburden on the surface of the moon, and rock masses doped in the lunar soil and the lunar rocks that occur under the lunar soil have high strength. On the moon, in addition to the effects of vacuum, weight loss and large temperature changes, under the influence of limited transport capacity of a lander, it is difficult for drilling equipment to provide strong propulsion, and it is difficult to replace the drill bit if it is stuck or damaged. At the same time, it is difficult for a lunar lander to provide great power for auxiliary equipment, which brings great difficulties to drilling of the lunar rocks.

SUMMARY OF THE INVENTION

The invention aims to provide a low-power microwave coring machine suitable for lunar rocks and a use method. The low-power microwave coring machine suitable for lunar rocks has the characteristics of being light in weight, capable of preventing sticking of drill tools and low in power.

To achieve the purpose, the invention adopts the following technical solutions:

The low-power microwave coring machine suitable for lunar rocks comprises a drill drum, a microwave generator, a high-precision slip ring structure, a rotary waveguide, a microwave generator, a rotary driver, two tunneling drivers, an equipment platform, equipment slide rails and a support framework, The equipment slide rails are symmetrically arranged on the equipment platform, a support framework front plate and a support framework rear plate are mounted on the equipment slide rails in a sliding manner, a rear end surface of the support framework rear plate is connected with a front end of the microwave generator, the microwave generator is mounted on the equipment platform in a sliding manner, a rear end of the microwave generator is connected with one end of a fixed waveguide, and the other end of the fixed waveguide is rotationally mounted at a rear end of the rotary waveguide; the rotary waveguide as a change-over device rotates itself and rotates and transmits microwaves from the fixed waveguide in a lossless manner; a front end of the rotary waveguide is connected with a rear end of a power divider, a front end of the power divider is connected with a rear end of the drill drum through coaxial cables, and a front end of the drill drum is in contact with a rock stratum; the high-precision slip ring structure sleeves an excircle of the drill drum, and lossless collection of reflection signals of the power divider under a rotary condition is realized; the rotary waveguide is located in a through hole in the top of the support framework rear plate, and the rotary waveguide can rotate in the through hole in the support framework rear plate; the drill drum is located in a through hole in the top of the support framework front plate, and the drill drum can rotate in the through hole in the support framework front plate; a gear ferrule is arranged on both of an outer wall of the rotary waveguide and an outer wall of the drill drum, and the gear ferrules are both located at a front end of the support framework rear plate and a front end of the support framework front plate which are in corresponding arrangement; a transmission gear engaged with the corresponding gear ferrule is arranged below each gear ferrule, the two transmission gears are both in key connection with a rotary shaft, a front end of the rotary shaft penetrates through a through hole in a middle of the support framework front plate and is in key connection with one of the transmission gears, a rear end of the rotary shaft is in key connection with the other transmission gear and penetrates through a through hole in a middle of the support framework rear plate to be connected with an output end of the rotary driver; and the rotary driver is fixedly mounted on the support framework rear plate through bolts, the gear ferrules are driven by the transmission gear of the rotary driver to rotate, and further the rotary waveguide, the power divider and the drill drum are driven to rotate together; a rear end of each tunneling driver is connected with a corresponding tunneling driver base, the tunneling driver bases are fixed on the equipment platform, a front end of each tunneling driver penetrates through a through hole in a middle and lower part of the support framework rear plate to be connected with the support framework front plate, the tunneling drivers propel the support framework front plate to apply propelling force on the drill drum, and the two tunneling drivers are symmetrically arranged by using the drill drum as a symcenter.

The drill drum is a hollow round metal tube, a plurality of through holes are drilled in an axial direction of a drum wall of the drill drum and are uniformly distributed in a circumferential direction, coaxial waveguides are respectively mounted in the through holes, a front end of each coaxial waveguide penetrates through the drum wall of the drill drum to be connected with a corresponding microwave radiator, a quartz sleeve which is fixed on a front end surface sleeves a front end of each microwave radiator, a rear end of each coaxial waveguide is connected with the corresponding coaxial cable, a cutter is mounted on an end surface of the drum wall of the drill drum between every two adjacent coaxial waveguides, and a height of each cutter is higher than that of the corresponding quartz sleeve.

The power divider comprises one microwave power input end, four microwave power output ends and four insulating and protecting ends, wherein the four microwave power output ends are respectively connected with the four insulating and protecting ends, the four insulating and protecting ends are respectively connected with the corresponding coaxial waveguides through the coaxial cables, the microwave power input end is connected with the rotary waveguide, and the power divider has an effect of allocating and adjusting an output power of each coaxial waveguide.

The microwave generator absorbs reflection microwaves through a solid loaded graphite plate, and adopts a heat conduction manner for cooling, and heat is transferred to an external environment; and a maximum power of the microwave generator is 1000 W, and a type of microwave adopts millimeter waves.

The high-precision slip ring structure comprises rotor signal lines, high-precision slip ring rotors, high-precision signal carbon brushes, high-precision slip ring stators and high-precision stator signal lines, wherein the high-precision slip ring rotors sleeve the excircle of the drill drum and synchronously rotate with the drill drum, each rotor signal line is connected to the corresponding high-precision slip ring rotor, the rotor signal lines are respectively connected with the four corresponding insulating and protecting ends through a signal converter, each high-precision slip ring rotor is rotationally connected with the corresponding high-precision slip ring stator through the corresponding high-precision signal carbon brush, the high-precision slip ring rotors rotate along with the drill drum, but the high-precision slip ring stators and the high-precision signal carbon brushes do not move, signals of the high-precision slip ring rotors are transmitted into the high-precision slip ring stators in a lossless manner through the high-precision signal carbon brushes, reflection wave signals are transmitted into a controller of the microwave generator through the high-precision stator signal lines, the controller controls the microwave generator in the low-power microwave coring machine to switch on and switch off, and microwave parameters are adjusted at any time through the reflection wave signals fed back by the high-precision slip ring structure.

The method of using the low-power microwave coring machine suitable for lunar rocks comprises the following steps:

Step 1: switching on a microwave generator and not starting tunneling drivers and a rotary driver, wherein properties of the rock stratum in regions irradiated by four microwave power output ends can be determined by reflection coefficients fed back by the four microwave power output ends, and when the reflection coefficients of the four microwave power output ends do not have differences, the properties of the rock stratum in the regions are consistent; when the reflection coefficients of the four microwave power output ends have significant differences, large reflection coefficients represent that the rock stratum of the regions having large reflection coefficients have high compactness; and in order to prevent a drill drum from shifting when directly drilling hard rocks without side wall constraints, regions having small reflection coefficients and not having differences are selected to start drilling work;

Step 2: starting the tunneling drivers and the rotary driver, wherein a change of the properties of the rock stratum along with a drilling depth is determined according to the reflection coefficients fed back by the four microwave power output ends; and when the reflection coefficients increase suddenly to exceed a maximum bearing reflection coefficient A of the microwave generator, that is to say, a reflection power reaches a half of a full-load power, a controller controls a power of the microwave generator to decrease, damage of the microwave generator caused by too large reflection is avoided, and besides, a propelling speed of the drill drum is decreased, so that the power is decreased, time is prolonged, and crack of the lunar rocks is caused by microwave irradiation; and Step 3: in a continuous drilling process, if the drill drum encounters sticking of drill tools, switching off the tunneling drivers and the rotary driver, wherein the microwave power output ends having small reflection coefficients are switched off according to the reflection coefficients fed back by the four microwave power output ends, then the power of the microwave power output ends having large reflection coefficients is gradually increased, the reflection coefficients are guaranteed not to exceed A, and after presplitting and loosening of the drill drum are completed in the regions of the microwave power output ends, the four microwave power output ends, the tunneling drivers and the rotary driver are switched on once again; and when the drilling depth reaches a sample requirement length, the drilling work is completed, and the microwave generator, the tunneling drivers and the rotary driver are switched off.

The low-power microwave coring machine and the use method have the beneficial effects after the technical solution is adopted:

(1) The rotary waveguide transmits microwaves to the coaxial waveguides from the fixed waveguide in a rotary transmission manner, the coaxial waveguides are internally located in the drum wall of the drill drum and rotate along with the drill drum, synchronous movement of a microwave system and a core drilling drill drum is realized, a microwave rock breaking technology is combined with the drill drum, the propelling force and the torque for the drill drum to drill the hard rocks are greatly reduced, and the problems of unmoving of the drill tools and sticking of the drill tools, of the equipment are solved; the purpose of drilling the hard rocks under the conditions of small scale and low power of the equipment is achieved, and the problems of unmoving of the drill tools and sticking of the drill tools can be solved.

(2) A method for causing crack of rocks with light low-power microwave equipment is adopted, the problem that the microwave equipment is too large in volume and too large in power is solved, the thrust required for drilling of the drill drum is reduced, and the purpose of miniaturization of a drill drum tunneling system can be achieved.

(3) Through multi-port millimeter wave irradiation of the power divider, the effects that outer rings of the rock cores are fractured completely but the rock cores are not fractured are realized; and through the multi-port microwave reflection coefficients, rock information of different depths can be obtained, besides, the output power of each port and switching on and switching off of the equipment can be dynamically adjusted and controlled according to the reflection coefficients, and damage of the microwave generator caused by too large reflection power is avoided.

1: rock stratum; 2: drill drum; 3: high-precision slip ring structure; 4: gear ferrule; 5: power divider; 6: rotary waveguide; 7: rotary driver; 8: fixed waveguide; 9: transmission gear; 10: equipment slide rail; 11: support framework front plate; 12: rotary shaft; 13: tunneling driver; 14: support framework rear plate; 15: microwave generator; 16: tunneling driver base; 17: equipment platform; 18: rotor signal line; 19: high-precision slip ring rotor; 20: high-precision signal carbon brush; 21: high-precision slip ring stator; 22: stator signal line; 23: microwave power input end; 24: microwave power output end; 25: insulating and protecting end; 26: coaxial cable; 27: coaxial waveguide; 28: microwave radiator; 29: quartz sleeve; 30: cutter.

DETAILED DESCRIPTION OF THE PREFERRED EMBODIMENT

The following describes the invention in more detail with reference to the accompanying drawings and examples.

Figure 1:
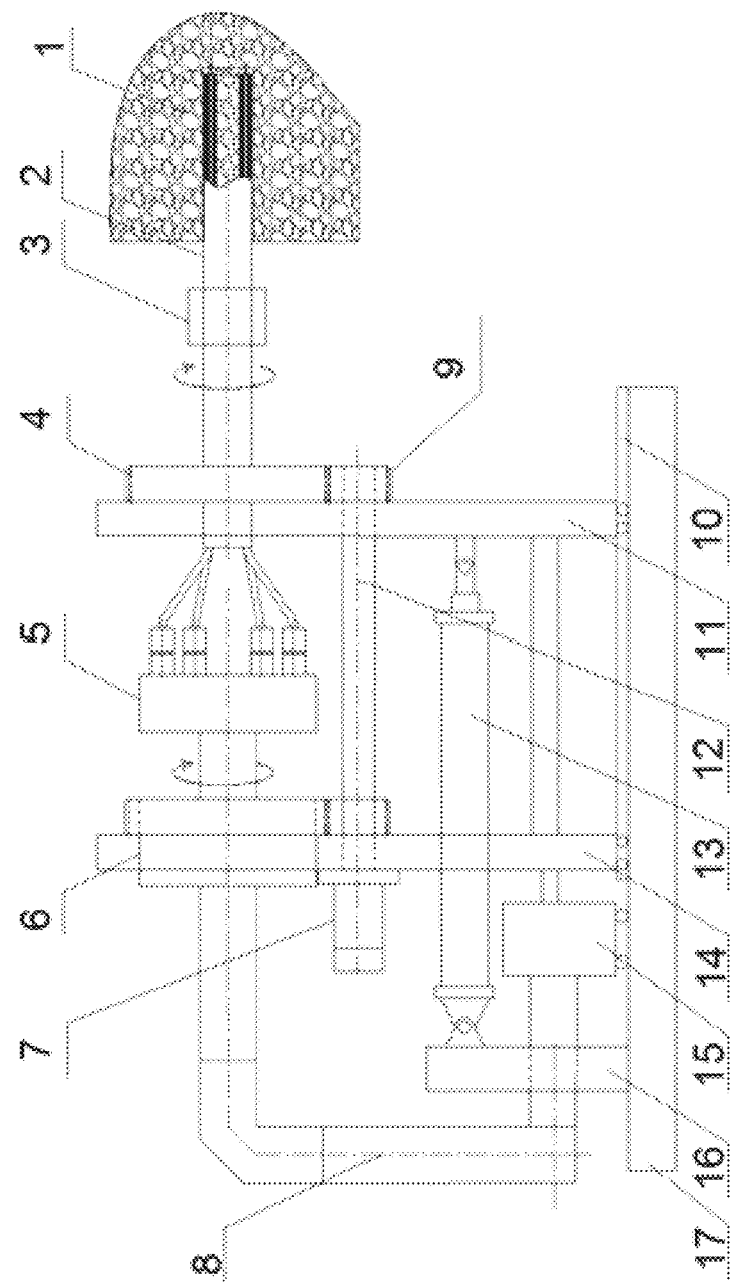
FIG. 1 illustrates the front view of a low-power microwave coring machine suitable for lunar rocks according to the invention.
Figure 2:
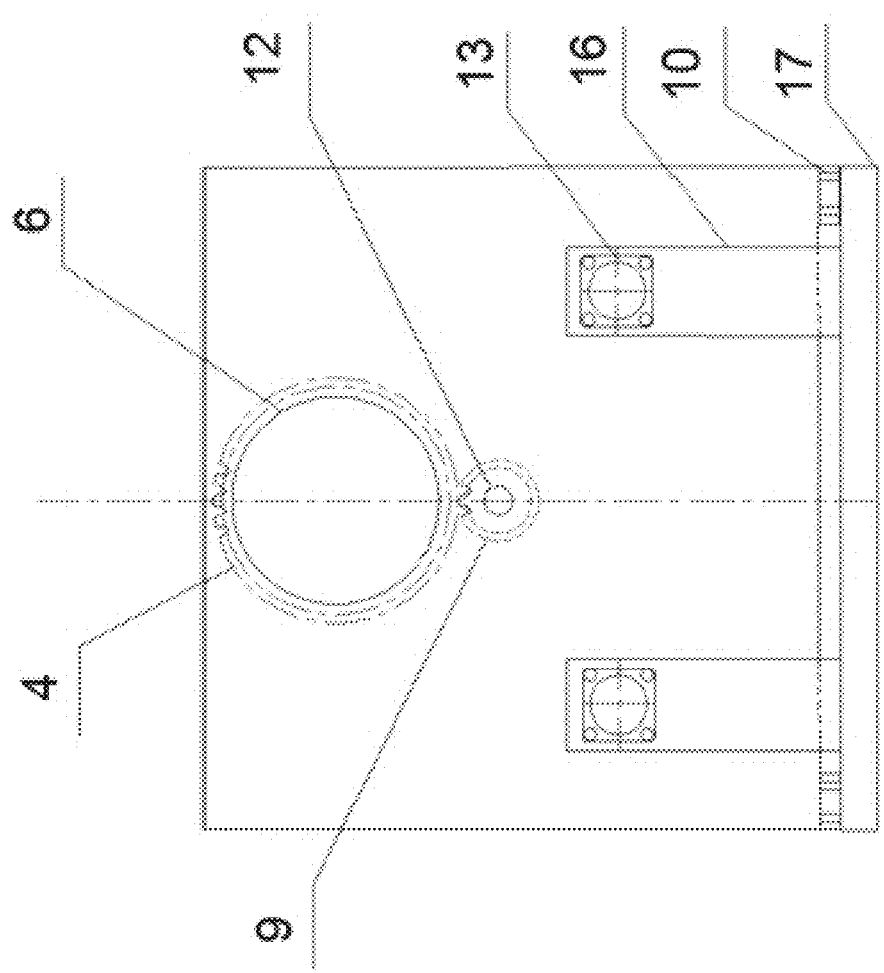
FIG. 2 illustrates the side view of the low-power microwave coring machine suitable for lunar rocks according to the invention.
Figure 3:
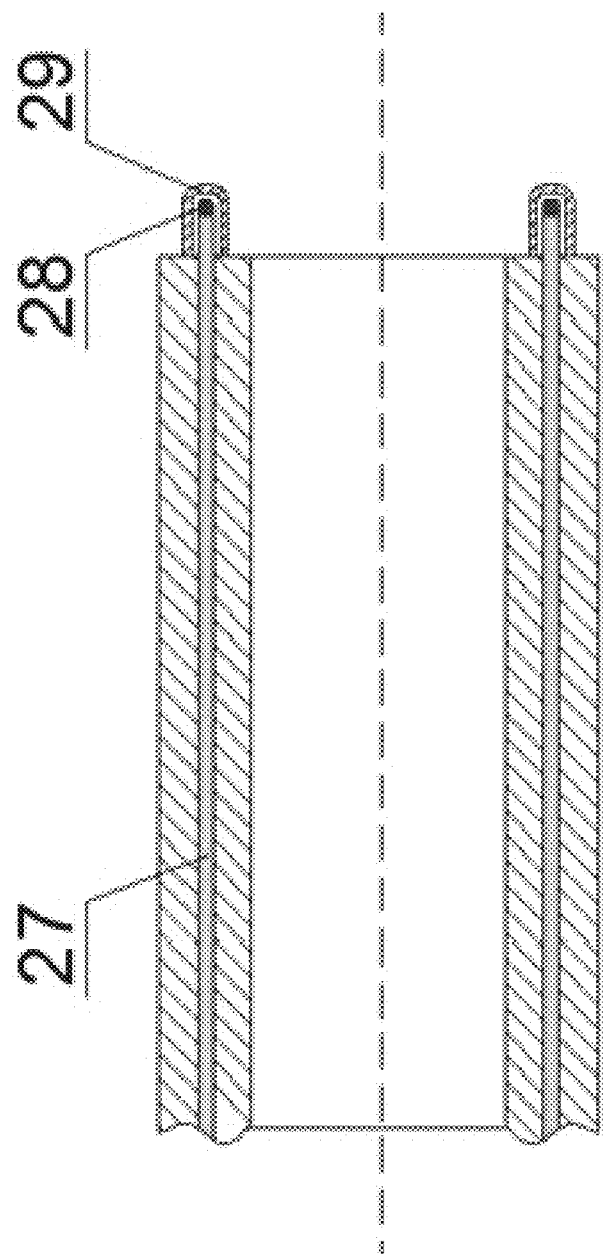
FIG. 3 illustrates the section view of a drill drum of the low-power microwave coring machine suitable for lunar rocks according to the invention.
Figure 4:
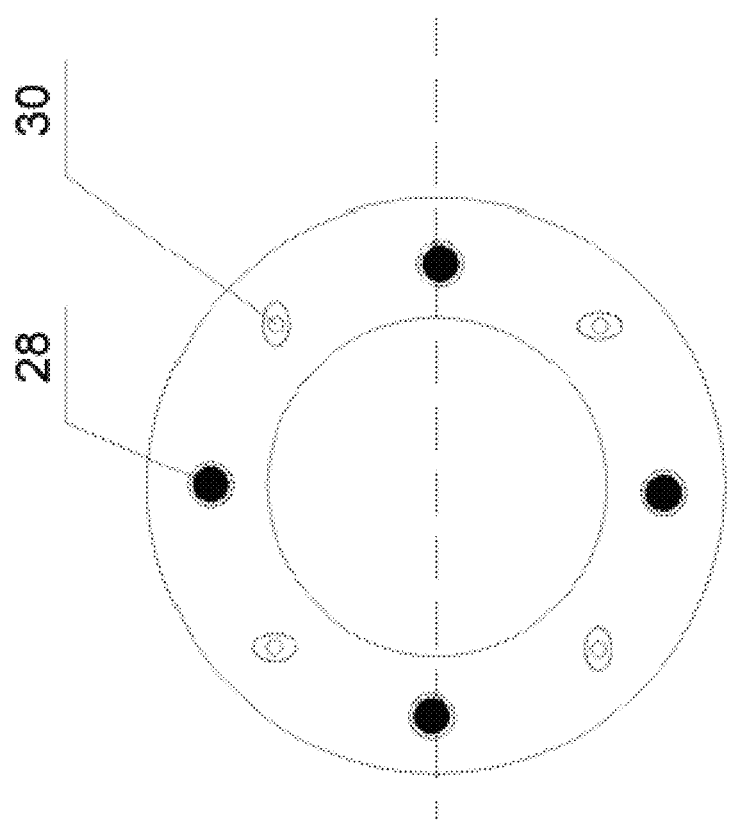
FIG. 4 illustrates the side view of the low-power microwave coring machine suitable for lunar rocks according to the invention.
Figure 5:
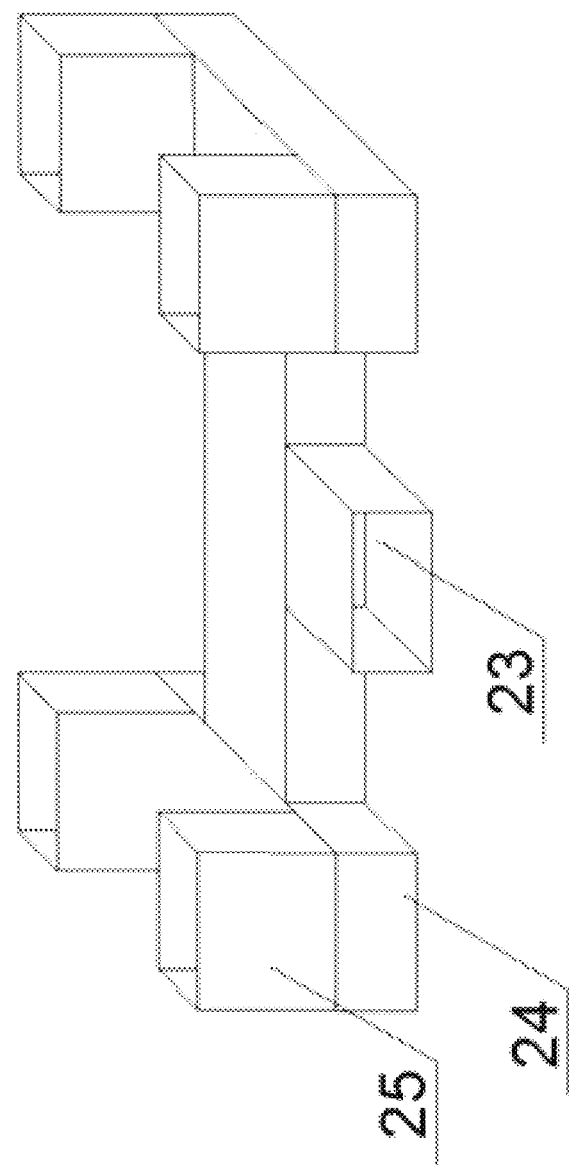
FIG. 5 illustrates the schematic diagram of a microwave power divider of the low-power microwave coring machine suitable for lunar rocks according to the invention.
Figure 6:
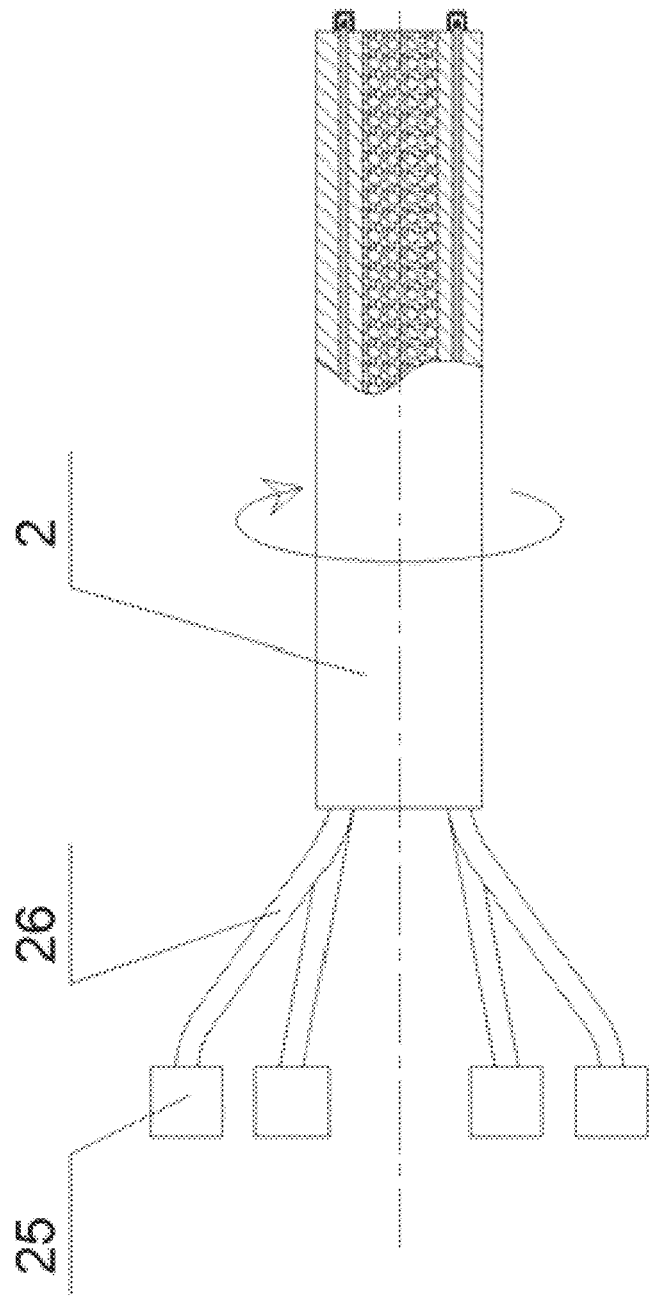
FIG. 6 illustrates the microwave-drill drum connection schematic diagram of the low-power microwave coring machine suitable for lunar rocks according to the invention.
Figure 7:
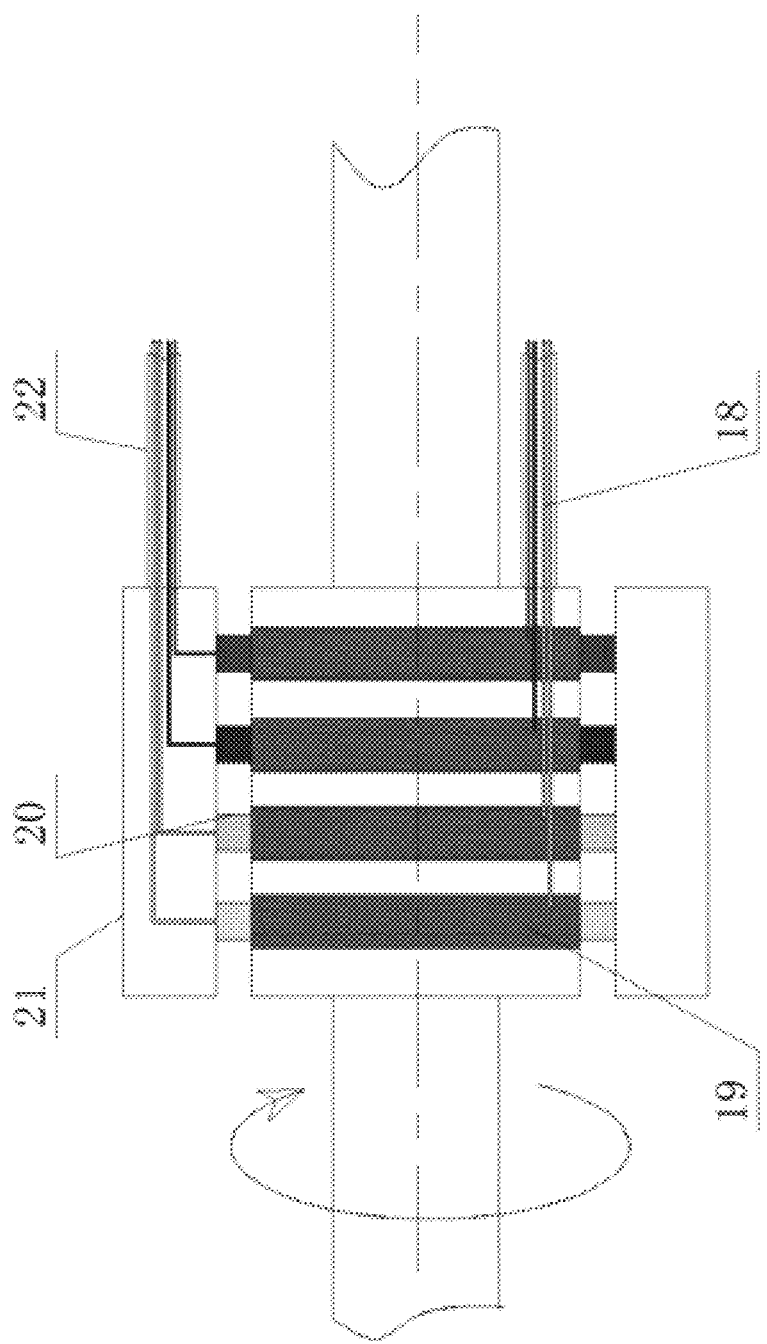
FIG. 7 illustrates the schematic view of a high-precision slip ring structure of the low-power microwave coring machine suitable for lunar rocks according to the invention.

As shown in FIG. 1 to FIG. 7, a low-power microwave coring machine suitable for lunar rocks comprises a drill drum 2, a microwave generator 15, a high-precision slip ring structure 3, a rotary waveguide 6, a rotary driver 7, two tunneling drivers 13, an equipment platform 17, equipment slide rails 10, a support framework front plate 11 and a support framework rear plate 14, The equipment slide rails 10 are symmetrically arranged on the equipment platform 17, the support framework front plate 11 and the support framework rear plate 14 are mounted on the equipment slide rails 10 in a sliding manner, a rear end surface of the support framework rear plate 14 is connected with a front end of the microwave generator 15, the microwave generator 15 is mounted on the equipment platform 17 in a sliding manner, a rear end of the microwave generator 15 is connected with one end of a fixed waveguide 8, and the other end of the fixed waveguide 8 is rotationally mounted at a rear end of the rotary waveguide 6; the rotary waveguide 6 as a change-over device rotates itself and rotates and transmits microwaves from the fixed waveguide in a lossless manner; a front end of the rotary waveguide 6 is connected with a rear end of a power divider 5, a front end of the power divider 5 is connected with a rear end of the drill drum 2 through coaxial cables 26, and a front end of the drill drum 2 is in contact with a rock stratum 1; the high-precision slip ring structure 3 sleeves an excircle of the drill drum 2, and lossless collection of reflection signals of the power divider 5 under a rotary condition is realized; the rotary waveguide 6 is located in a through hole in a top of the support framework rear plate 14, and the rotary waveguide 6 can rotate in the through hole in the support framework rear plate 14; the drill drum 2 is located in a through hole in a top of the support framework front plate 11, and the drill drum 2 can rotate in the through hole in the support framework front plate 11; a gear ferrule 4 is arranged on both of an outer wall of the rotary waveguide 6 and an outer wall of the drill drum 2, and the gear ferrules 4 are both located at a front end of the support framework rear plate 14 and a front end of the support framework front plate 11 which are in corresponding arrangement; a transmission gear 9 engaged with the corresponding gear ferrule is arranged below each gear ferrule 4, the two transmission gears 9 are both connected to a rotary shaft 12 through keys, a front end of the rotary shaft 12 penetrates through a through hole in a middle of the support framework front plate 11 and is in key connection with one of the transmission gears 9, a rear end of the rotary shaft 12 is in key connection with the other transmission gear 9 and penetrates through a through hole in a middle of the support framework rear plate 14 to be connected with an output end of the rotary driver 7; the rotary driver 7 is fixedly mounted on the support framework rear plate 14 through bolts, the gear ferrules 4 are driven by the transmission gear 9 of the rotary driver 7 to rotate, and further the rotary waveguide 6, the power divider 5 and the drill drum 2 are driven to rotate together; a rear end of each tunneling driver 13 is connected with a corresponding tunneling driver base 16, the tunneling driver bases 16 are fixed on the equipment platform 17, a front end of each tunneling driver 13 penetrates through a through hole in a middle and lower part of the support framework rear plate 14 to be connected with the support framework front plate 11, the tunneling drivers 13 propel the support framework front plate 11 to apply propelling force on the drill drum 2, and the two tunneling drivers 13 are symmetrically arranged by using the drill drum 2 as a symcenter.

The drill drum 2 is a hollow round metal tube with a wall thickness of 10 mm, a plurality of through holes are drilled in an axial direction of a drum wall of the drill drum 2 and are uniformly distributed in a circumferential direction, coaxial waveguides 27 are respectively mounted in the through holes, the total quantity of the coaxial waveguides is 4, a front end of each coaxial waveguide 27 penetrates through the drum wall of the drill drum 2 to be connected with a corresponding microwave radiator 28, a quartz sleeve 29 which is fixed on a front end surface sleeves a front end of each microwave radiator 28, a rear end of each coaxial waveguide 27 is connected with the corresponding coaxial cable 26, a cutter 30 is mounted on an end surface of the drum wall of the drill drum 2 between every two adjacent coaxial waveguides 27, and a height of each cutter 30 is higher than that of the corresponding quartz sleeve 29.

The power divider 5 comprises one microwave power input end 23, four microwave power output ends 24 and four insulating and protecting ends 25, wherein the four microwave power output ends 24 are respectively connected with the four insulating and protecting ends 25, the four insulating and protecting ends 25 are respectively connected with the corresponding coaxial waveguides 27 through the coaxial cables 26, the microwave power input end 23 is connected with the rotary waveguide 6, and the power divider has an effect of allocating and adjusting an output power of each coaxial waveguide 27.

The microwave generator 15 absorbs reflection microwaves through a solid loaded graphite plate, and adopts a heat conduction manner for cooling, and heat is transferred to an external environment; and a maximum power of the microwave generator 15 is 1000 W, and a type of microwave adopts millimeter waves.

The high-precision slip ring structure 3 comprises rotor signal lines 18, high-precision slip ring rotors 19, high-precision signal carbon brushes 20, high-precision slip ring stators 21 and high-precision stator signal lines 22, wherein the high-precision slip ring rotors 19 sleeve the excircle of the drill drum 2 and synchronously rotate with the drill drum 2, each rotor signal line 18 is connected to the corresponding high-precision slip ring rotor 19, the rotor signal lines 18 are respectively connected with the four corresponding insulating and protecting ends 25 through a signal converter, each high-precision slip ring rotor 19 is rotationally connected with the corresponding high-precision slip ring stator 21 through the corresponding high-precision signal carbon brush 20, the high-precision slip ring rotors 19 rotate along with the drill drum 2, but the high-precision slip ring stators 21 and the high-precision signal carbon brushes 20 do not move, signals of the high-precision slip ring rotors 19 are transmitted into the high-precision slip ring stators 21 in a lossless manner through the high-precision signal carbon brushes 20, reflection wave signals are transmitted into a controller of the microwave generator 15 through the high-precision stator lines 22, the controller controls the microwave generator 15 in the low-power microwave coring machine to switch on and switch off, and microwave parameters are adjusted at any time through the reflection wave signals fed back by the high-precision slip ring structure 3.

The method of using the low-power microwave coring machine suitable for lunar rocks comprises the following steps:

Step 1: switching on a microwave generator 15 and not starting tunneling drivers 13 and a rotary driver 7, wherein properties of rock stratum 1 in regions irradiated by four microwave power output ends 24 can be determined by reflection coefficients fed back by the four microwave power output ends 24, and when the reflection coefficients of the four microwave power output ends 24 do not have differences, the properties of the rock stratum 1 in the regions are consistent; when the reflection coefficients of the four microwave power output ends 24 have significant differences, large reflection coefficients represent that the rock stratum 1 of the regions having large reflection coefficients have high compactness; and in order to prevent a drill drum 2 from directly drilling hard rocks to cause drilling deviation when not having side wall constraint, regions having small reflection coefficients and not having differences are selected to start drilling work;

Step 2: starting the tunneling drivers 13 and the rotary driver 7, wherein a change of the properties of the rock stratum 1 along with a drilling depth is determined according to the reflection coefficients fed back by the four microwave power output ends 24; and when the reflection coefficients increase suddenly to exceed a maximum bearing reflection coefficient A of the microwave generator 15, that is to say, a reflection power reaches a half of a full-load power, a controller controls a power of the microwave generator 15 to decrease, damage of the microwave generator 15 caused by too large reflection is avoided, and besides, a propelling speed of the drill drum 2 is decreased, so that the power is decreased, time is prolonged, and crack of the lunar rocks is caused by microwave irradiation; and Step 3: in the continuous drilling process, if the drill drum 2 encounters sticking of drill tools, switching off the tunneling drivers 13 and the rotary driver 7, wherein the microwave power output ends 24 having small reflection coefficients are switched off according to the reflection coefficients fed back by the four microwave power output ends 24, then the power of the microwave power output ends 24 having large reflection coefficients is gradually increased, the reflection coefficients are guaranteed not to exceed A, and after presplitting and loosening of the drill drum 2 are completed in the regions of the microwave power output ends 24, the four microwave power output ends 24, the tunneling drivers 13 and the rotary driver 7 are switched on once again; and when the drilling depth reaches a sample requirement length, the drilling work is completed, and the microwave generator 15, the tunneling drivers 13 and the rotary driver 7 are switched off.

What is claimed is:

1. A low-power microwave coring machine suitable for lunar rocks, comprising: a drill drum, a microwave generator, a high-precision slip ring structure, a rotary waveguide, a microwave generator, a rotary driver, two tunneling drivers, an equipment platform, equipment slide rails and a support framework, wherein the equipment slide rails are symmetrically arranged on the equipment platform, a support framework front plate and a support framework rear plate are mounted on the equipment slide rails in a sliding manner, a rear end surface of the support framework rear plate is connected with a front end of the microwave generator, the microwave generator is mounted on the equipment platform in a sliding manner, a rear end of the microwave generator is connected with one end of a fixed waveguide, and the other end of the fixed waveguide is rotationally mounted at a rear end of the rotary waveguide; the rotary waveguide as a changeover device rotates itself and rotates and transmits microwaves from the fixed waveguide in a lossless manner; a front end of the rotary waveguide is connected with a rear end of a power divider, a front end of the power divider is connected with a rear end of the drill drum through coaxial cables, and a front end of the drill drum is in contact with a rock stratum; the high-precision slip ring structure sleeves an excircle of the drill drum, and lossless collection of reflection signals of the power divider under a rotary condition is realized; the rotary waveguide is located in a through hole in a top of the support framework rear plate, and the rotary waveguide can rotate in the through hole in the support framework rear plate; the drill drum is located in a through hole in a top of the support framework front plate, and the drill drum can rotate in the through hole in the support framework front plate; a gear ferrule is arranged on both of an outer wall of the rotary waveguide and an outer wall of the drill drum, and the gear ferrules are both located at a front end of the support framework rear plate and a front end of the support framework front plate which are in corresponding arrangement; a transmission gear engaged with the corresponding gear ferrule is arranged below each gear ferrule, the two transmission gears are both in key connection with a rotary shaft, a front end of the rotary shaft penetrates through a through hole in a middle of the support framework front plate and is in key connection with one of the transmission gears, a rear end of the rotary shaft is in key connection with the other transmission gear and penetrates through a through hole in a middle of the support framework rear plate to be connected with an output end of the rotary driver; the rotary driver is fixedly mounted on the support framework rear plate through bolts, the gear ferrules are driven by the transmission gear of the rotary driver to rotate, and further the rotary waveguide, the power divider and the drill drum are driven to rotate together; and a rear end of each tunneling driver is connected with a corresponding tunneling driver base, the tunneling driver bases are fixed on the equipment platform, a front end of each tunneling driver penetrates through a through hole in a middle and lower part of the support framework rear plate to be connected with the support framework front plate, the tunneling drivers propel the support framework front plate to apply propelling force on the drill drum, and the two tunneling drivers are symmetrically arranged by using the drill drum as a symcenter.

2. The low-power microwave coring machine according to claim 1, wherein the drill drum is a hollow round metal tube, a plurality of through holes are drilled in an axial direction of a drum wall of the drill drum and are uniformly distributed in a circumferential direction, coaxial waveguides are respectively mounted in the through holes, a front end of each coaxial waveguide penetrates through the drum wall of the drill drum to be connected with a corresponding microwave radiator, a quartz sleeve which is fixed on a front end surface sleeves a front end of each microwave radiator, a rear end of each coaxial waveguide is connected with the corresponding coaxial cable, a cutter is mounted on an end surface of the drum wall of the drill drum between every two adjacent coaxial waveguides, and a height of each cutter is higher than that of the corresponding quartz sleeve.

3. The low-power microwave coring machine according to claim 1, wherein the power divider comprises one microwave power input end, four microwave power output ends and four insulating and protecting ends, the four microwave power output ends are respectively connected with the four insulating and protecting ends, the four insulating and protecting ends are respectively connected with the corresponding coaxial waveguides through the coaxial cables, the microwave power input end is connected with the rotary waveguide, and the power divider has an effect of allocating and adjusting an output power of each coaxial waveguide.

4. The low-power microwave coring machine according to claim 1, wherein the microwave generator absorbs reflection microwaves through a solid loaded graphite plate, and adopts a heat conduction manner for cooling, and heat is transferred to an external environment; and a maximum power of the microwave generator is 1000 W, and a type of microwave adopts millimeter waves.

5. The low-power microwave coring machine according to claim 1, wherein the high-precision slip ring structure comprises rotor signal lines, high-precision slip ring rotors, high-precision signal carbon brushes, high-precision slip ring stators and high-precision stator signal lines, wherein the high-precision slip ring rotors sleeve the excircle of the drill drum and synchronously rotate with the drill drum, each rotor signal line is connected to the corresponding high-precision slip ring rotor, the rotor signal lines are respectively connected with the four corresponding insulating and protecting ends through a signal converter, each high-precision slip ring rotor is rotationally connected with the corresponding high-precision slip ring stator through the corresponding high-precision signal carbon brush, the high-precision slip ring rotors rotate along with the drill drum, but the high-precision slip ring stators and the high-precision signal carbon brushes do not move, signals of the high-precision slip ring rotors are transmitted into the high-precision slip ring stators in a lossless manner through the high-precision signal carbon brushes, reflection wave signals are transmitted into a controller of the microwave generator through the high-precision stator lines, the controller controls the microwave generator in the low-power microwave coring machine to switch on and switch off, and microwave parameters are adjusted at any time through the reflection wave signals fed back by the high-precision slip ring structure.

6. A method of using the low-power microwave coring machine suitable for lunar rocks according to claim 1, comprising the following steps:

step 1: switching on a microwave generator and not starting tunneling drivers and a rotary driver, wherein properties of the rock stratum in regions irradiated by four microwave power output ends is determined by reflection coefficients fed back by the four microwave power output ends, and when the reflection coefficients of the four microwave power output ends do not have differences, the properties of the rock stratum in the regions are consistent; when the reflection coefficients of the four microwave power output ends have significant differences, large reflection coefficients represent that the rock stratum of the regions having large reflection coefficients have high compactness; and in order to prevent a drill drum from directly drilling hard rocks to cause drilling deviation when not having side wall constraint, regions having small reflection coefficients and not having differences are selected to start drilling work;

step 2: starting the tunneling drivers and the rotary driver, wherein a change of the properties of the rock stratum along with a drilling depth is determined according to the reflection coefficients fed back by the four microwave power output ends; and when the reflection coefficients increase suddenly to exceed a maximum bearing reflection coefficient A of the microwave generator, a reflection power reaches a half of a full-load power, a controller controls the power of the microwave generator to decrease, damage of the microwave generator caused by too large reflection is avoided, and a propelling speed of the drill drum is decreased, so that the power is decreased, time is prolonged, and crack of the lunar rocks is caused by microwave irradiation; and step 3: in a continuous drilling process, if the drill drum encounters sticking of drill tools, switching off the tunneling drivers and the rotary driver, wherein the microwave power output ends having small reflection coefficients are switched off according to the reflection coefficients fed back by the four microwave power output ends, then the power of the microwave power output ends having large reflection coefficients is gradually increased, the reflection coefficients are guaranteed not to exceed A, and after presplitting and loosening of the drill drum are completed in the regions of the microwave power output ends, the four microwave power output ends, the tunneling drivers and the rotary driver are switched on once again; and when the drilling depth reaches a sample requirement length, the drilling work is completed, and the microwave generator, the tunneling drivers and the rotary driver are switched off.

* * * * *